Jan. 18, 1955     Q. J. GINDELE     2,700,078
OVEN LIGHT SWITCH

Filed Nov. 7, 1952     2 Sheets-Sheet 1

INVENTOR.
QUENTIN J. GINDELE
BY Alden L. Redfield
Warren Kunz
ATTORNEYS.

Jan. 18, 1955 Q. J. GINDELE 2,700,078
OVEN LIGHT SWITCH
Filed Nov. 7, 1952 2 Sheets-Sheet 2

INVENTOR.
QUENTIN J. GINDELE
BY Alden D. Redfield
Warren Kunz.
ATTORNEYS.

United States Patent Office 2,700,078
Patented Jan. 18, 1955

2,700,078

OVEN LIGHT SWITCH

Quentin J. Gindele, Cincinnati, Ohio, assignor to Avco Manufacturing Corporation, Cincinnati, Ohio, a corporation of Delaware Application November 7, 1952, Serial No. 319,324

6 Claims. (Cl. 200—61.79)

The present invention relates to an electrical switch and its actuating mechanism and concerns more particularly a switch installation in circuit with a light source within the oven of a domestic range.

More specifically, the present invention concerns an "on-off" switch for controlling a light within the oven of an electric range. Broadly, the provision in an oven of a light source controlled by a switch which is actuated by movements of the oven door is well-known. The present invention goes beyond this conventional concept and provides a switch installation that may be used in a conventional manner to turn the oven light on and off, or may be manually latched in an "off" position while the oven door is open. The switch installation is so arranged that closing the oven door releases the switch and resets it for conventional operation.

Briefly stated, the present invention comprises an electrical switch secured to an internal partition of the range. A pivoted bell-crank is rotatably positioned adjacent the switch and includes a finger projecting through a forward wall of the range. When this finger is forced in and out, as by closing and opening movements, respectively, of the oven door, the bell-crank is swung about its pivot and actuates the switch.

The bell-crank is slotted adjacent the pivot point so that it may be manually shifted towards the switch and latched in an "off" position by being engaged behind a dimple, or projection, formed in a forward wall of the range. The balance of forces acting on the bell-crank is such that it may be released from its engagement with the dimple by being rotated slightly about the pivot point, the bell-crank thereafter automatically shifting away from the switch and being restored to a position of normal operation.

In view of the foregoing, it will be obvious that an object of the present invention is the provision of an improved oven light switch installation.

More specifically, it is an object of the present invention to provide for a domestic range an "on-off" switch for oven door actuation which can be manually latched in an "off" position.

Further, it is an object of the invention to provide an "on-off" switch which can be latched in an "off" position and automatically released from that position by a normal actuating movement.

It is further an object of the present invention to provide an "on-off" oven switch which can be latched in an "off" position and automatically returned to a position for normal "on-off" operation through the closing of an associated oven door.

Another object of this invention is to provide a cheap, fool-proof, simple switch installation for a domestic range, and one which is designed for oven door or manual actuation.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
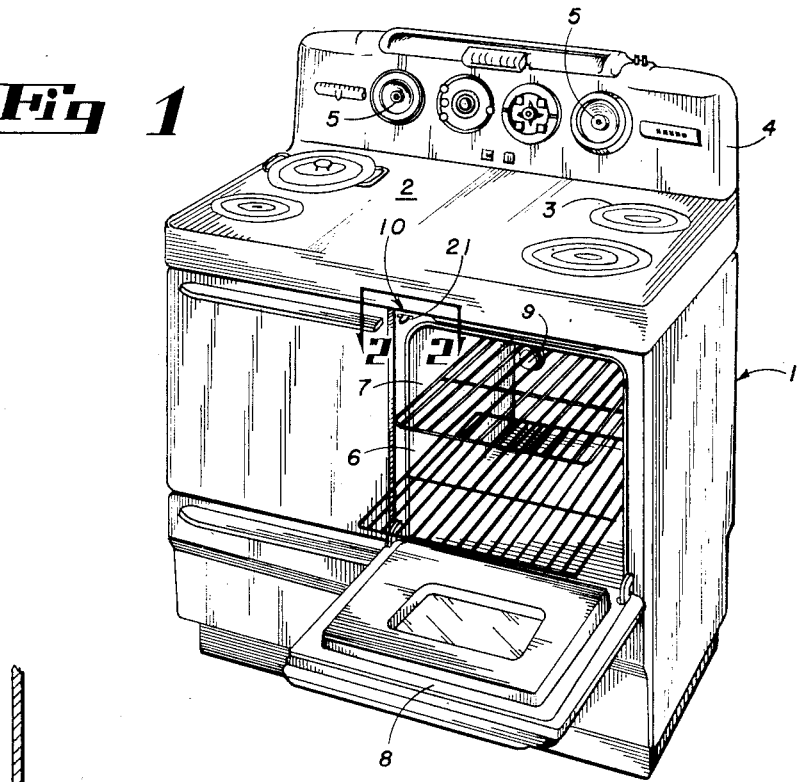
Figure 1 is a perspective view of an electric range in which the present invention finds particular utility.

The present invention is shown in association with an electric range, generally designated 1, including a top panel 2, surface burners 3, and a backguard 4 having thermostatic controls 5 for a pair of ovens within the range. One of these ovens has been indicated at 6. This oven is defined by an inner liner 7 and an oven door 8. For the purposes of the present application, the oven may be considered conventional in all respects and is used in a normal manner for baking and broiling purposes. As is common in ranges today, a light bulb 9 is provided for illuminating the oven when the door 8 is opened. Energization of the light is under the control of a light switch, generally designated 10, which is actuated by movements of the oven door 8. When the door is closed, the switch is forced into its "off" position and when the door is opened the switch returns to an "on" position. In this way, the oven is illuminated whenever the door is opened for inspection of the interior.

It is customary in an electric range for the oven door to be open slightly while food is being broiled. Further, the oven door is often opened to cool the interior of the oven after baking at a high temperature, before resuming baking at a lower temperature. During these times, it is desirable to turn off the oven light to conserve electricity. It may also be desirable to turn off the light when the oven liner is being cleaned, to preclude any danger from electrical shock or heat from the light bulb. In ranges built heretofore, it has not been possible to turn off the light at such times without unscrewing the oven light bulb, something which is obviously undesirable and impractical. As will be described more fully hereinafter, the present invention makes it possible to de-energize the light when the door is open without interfering in any way with normal "on-off" operation incidental to opening and closing movements of the oven door.

Figure 2:
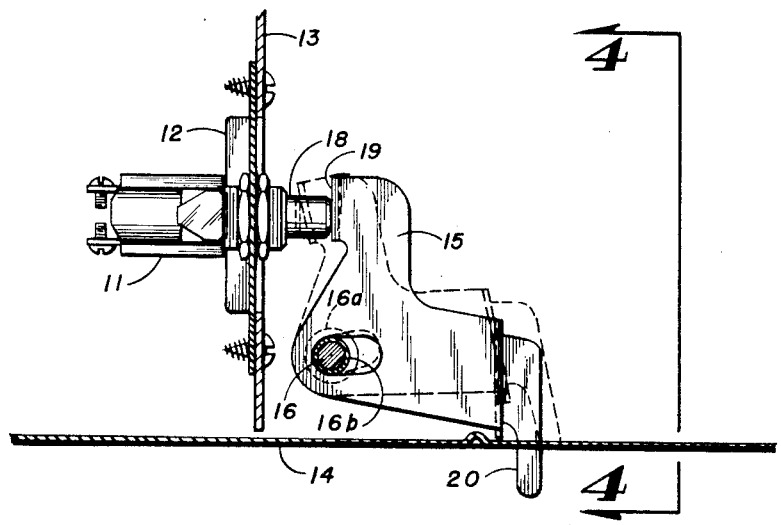
Figure 2 is a horizontal cross sectional view taken on plane 2—2 of Figure 1 showing the switch installation in top plan view.
Figure 3:
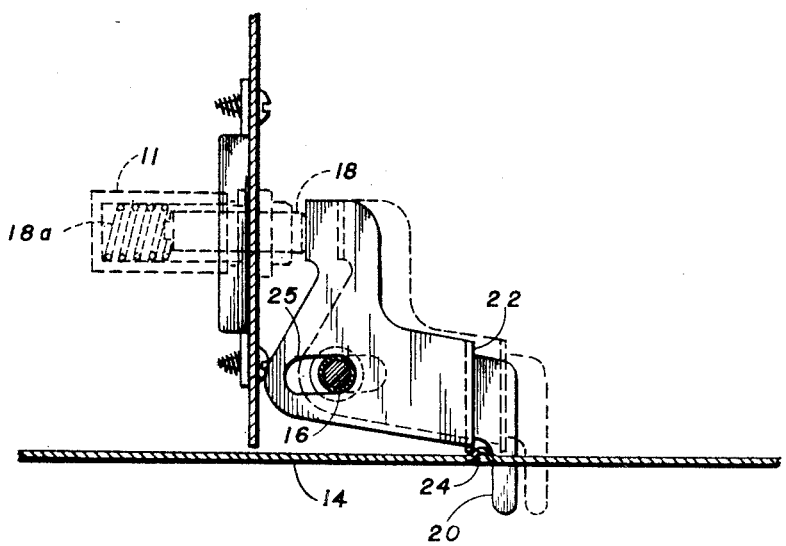
Figure 3 is a view similar to Figure 2 showing the bell-crank of the switch installation latched in an "off" position.

With particular reference to Figures 2 and 3, an electrical switch 11 is secured to a mounting plate 12 which, in turn, is releasably attached to a baffle 13, disposed perpendicularly to front wall 14 of the range frame.

Figure 4:
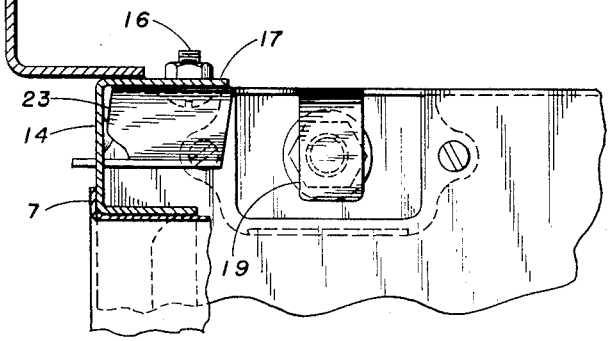
Figure 4 is a cross sectional view of the switch installation taken on plane 4—4 of Figure 2.

A bell-crank 15 is supported for rotation in a horizontal plane about a fixed bolt 16 which is secured to flange 17 (see Figure 4) extending rearwardly from the range frame. A washer 16a having an annular projecting shoulder 16b is provided between bolt 16 and bell-crank 15 to permit tightening of the bolt without restraining movement of the bell-crank. As indicated by the full and dash lines in Figure 2, the bell-crank 15 may be pivoted around bolt 16 to actuate plunger 18 of switch 11 for "on-off" operation.

A spring, provided at 18a (Figure 3) within switch 11, forces plunger 18 outwardly at all times. In this way, the plunger 18 is maintained in bearing engagement with transverse portion 19 of bell-crank 15. The spring-loaded plunger 18 thus urges clockwise rotation of bell-crank 15, as viewed in Figure 2, at all times. It will be noted that the bell-crank includes a finger 20 which projects through a slot 21 in wall 14 and is so positioned that it is engaged by the oven door 8 when the door is closed. As the door approaches a fully closed position, the bell-crank is forced from its full to its dash line position shown in Figure 2 and the plunger 18 is forced into switch 11, breaking the circuit associated with the oven light. When the door is opened, the spring-loaded plunger rotates the bell-crank clockwise and forces finger 20 forward. As the plunger moves out of the switch, the oven light circuit is completed.

To understand the novel construction and operation of this invention, it should be noted that the bell-crank includes an offset portion 22 which has a sloping forward edge 23 positioned for engagement with a dimple, or rearward projection, 24 formed in wall 14 of the range frame. Offset 22 extends between the main body portion of the bell-crank 15 and the finger 20 which projects forwardly from the face of the range. It is also to be noted that bolt 16 passes through a slot 25 in the bell-crank. As already described with reference to Figure 2, the left end of the slot is normally adjacent bolt 16 about which the bell-crank executes simple rotation for effecting conventional "on-off" operation of switch 11.

When the user of the range desires to turn the oven light off while having the oven door open, it is merely necessary for him to manually force finger 20 towards the left, from the dash line to the full line position shown in Figure 3. This motion causes the bell-crank to shift bodily to the left, shifting of the bell-crank being permitted by the slot 25. Simultaneously with this movement of the bell-crank, plunger 18 of switch 11 is forced into its "off" position and the sloping forward edge 23 of the bell-crank is brought into latched engagement behind dimple 24. With the bell-crank in this position, the force of plunger 18 bearing against the bell-crank tends to rotate it as a whole about dimple 24 as a fulcrum. Such rotation is prevented by the restraint of the shoulder of slot 25 bearing against the shoulder 16b of washer 16a surrounding bolt 16. Thus the switch will remain in its "off" position and the bell-crank will remain latched behind dimple 24. If the user of the range desires to restore normal "on-off" operation of the switch, it is merely necessary for him to press rearwardly on finger 20. Such a force imparted to the bell-crank will cause partial rotation about bolt 16 and force edge 23 of the bell-crank beyond dimple 24. As soon as the bell-crank is clear of the dimple, the force of plunger 18 moves the bell-crank towards the right from the full line to the dash line position shown in Figure 3, returning the bell-crank to the position of conventional use shown in Figure 2.

Rather than manually forcing the finger 20 towards the rear of the range, to restore conventional operation, the user may simply close the oven door. As the face of the door comes into bearing engagement with the end of finger 20, the bell-crank is forced clear of dimple 24 and the normal switch position is resumed, as has been described. There is little frictional restraint between finger 20 and the face of the oven door so that the force of the switch plunger 18 is ample to shift the bell-crank towards the right, as indicated in Figure 3.

In view of the foregoing description, it will be obvious that a novel and improved switch installation has been provided which has particular utility in a range, of either the gas or electric type. It will be noted that the switch installation is such that normal "on-off" operation is possible in conjunction with the opening and closing of the oven door. It will also be appreciated that the switch installation is such that the oven light may be temporarily turned off and that conventional operation may be restored merely by closing the oven door.

Having described a preferred embodiment of my invention, I claim:

1. An oven light switch installation for an electric range having an oven with an oven light and a door for closing the oven comprising a bell-crank pivotally secured to the range, an electric switch adjacent one end of said bell-crank having a movable plunger spring-urged into bearing engagement against the bell-crank, a finger at the other end of the bell-crank projecting forwardly from the range into position for engagement by the oven door when closed, a dimple formed in the front of the range for engagement by said bell-crank, said bell-crank being shiftable about its pivot point for latched engagement with said dimple, said bell-crank being released from said dimple by closing of the oven door.

2. A switch installation for use in a range having a vertical frame and a rearwardly extending baffle perpendicular to the range frame comprising a bell-crank pivotally secured to said frame for movement in a horizontal plane, an electric switch secured to said baffle adjacent one end of said bell-crank, said switch having a spring-urged plunger bearing against said one end of said bell-crank, the other end of said bell-crank having a finger projecting forwardly from the range frame, a rearwardly extending projection on said range frame adjacent said finger, said bell-crank being shiftable into engagement behind said projection for forcing said plunger into said switch and into its "off" position, said bell-crank being releasable from said projection by a rearward force applied to said finger.

3. An oven light switch installation for use in a range having at its front a structural element adjacent an oven door, a pivot pin secured to the structural element adjacent the door, a bell-crank formed to define a slot intermediate its ends, said slot being engaged with said pivot pin, an electric switch secured to the range and having a plunger spring-urged into bearing engagement with one end of said bell-crank, a finger on the other end of said bell-crank projecting into position for engagement by the oven door when closed, said bell-crank executing simple rotation about said pivot pin when engaged by the oven door whereby said bell-crank is swung against the plunger of said switch for turning it off as the door is closed, a dimple formed in the structural element of the range adjacent said bell-crank, said bell-crank being shiftable towards said switch for engagement behind said dimple, the slot of said bell-crank accommodating said shifting movement, said bell-crank being releasable from said dimple by a rearward force applied to said finger of said bell-crank.

4. An oven light switch installation for use in a range having an oven surrounded at its front by a structural frame, a light within the oven, and a door for closing the oven comprising a bell-crank; a pivot pin secured to the frame of the range, said bell-crank being in slotted engagement with said pin; an electric switch having a resilient member bearing against one end of said bell-crank; a projection on the other end of said bell-crank extending forwardly of the range for engagement by the door when closed; a dimple formed in the frame of the range adjacent said bell-crank, said bell-crank being shiftable for engagement behind said dimple for holding the switch open but being releasable from the dimple by a rearward force applied to said projection of said bell-crank.

5. An electric switch installation in an electric range having a vertical frame surrounding the access opening of an oven and an oven door for closing the access opening comprising a vertical pivot pin secured to said frame adjacent the access opening of the oven, a bell-crank defining a slot, said pin passing through the slot of said bell-crank whereby said bell-crank is movably secured to the range frame, an electric switch having a resilient member in engagement with one end of said bell-crank, a finger projecting from the other end of said bell-crank through a slot formed in the range frame, said finger projecting into position for engagement by the oven door when closed, and a rearwardly extending projection in the range frame adjacent said bell-crank located so that it may be shifted relative to said pivot pin for engagement behind said projection, the slot in said bell-crank accommodating the shifting movement whereby the switch is held in open position, said bell-crank being rotatable about the pivot pin by a rearward force applied to said finger whereby said bell-crank may be released from said projection, said bell-crank executing simple rotary movement about said pivot pin in response to opening and closing movements of the oven door whereby said electric switch is actuated in normal operation.

6. A switch installation for a range comprising a rotary member secured to the range for rotation about a pivotal axis and for laterally shiftable movements in a direction perpendicular to the axis, an electric switch having a movable member in engagement with a portion of said rotary member, means for imparting rotation to said rotary member to operate said switch, and a fixed projection on said range adjacent said rotary member, said rotary member being shiftable laterally into releasable engagement with said projection whereby said electric switch may be held in a predetermined position of operation.

References Cited in the file of this patent
UNITED STATES PATENTS

| | | |
|---|---|---|
| 1,652,364 | Kern | Dec. 13, 1927 |
| 2,164,239 | Grayson | June 27, 1939 |
| 2,313,506 | Berg | Mar. 9, 1943 |
| 2,414,343 | Stoeck et al. | Jan. 14, 1947 |
| 2,592,660 | Crumley | Apr. 15, 1952 |